(12) United States Patent
Soreide et al.

(10) Patent No.: US 9,798,004 B2
(45) Date of Patent: *Oct. 24, 2017

(54) LASER RANGING SENSORS AND METHODS THAT USE A LADDER OF SYNTHETIC WAVES HAVING INCREASING WAVELENGTHS TO CALCULATE A DISTANCE MEASUREMENT

(71) Applicant: The Boeing Company, Chicago, IL (US)

(72) Inventors: David C. Soreide, Seattle, WA (US); Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,826

(22) Filed: Aug. 11, 2016

(65) Prior Publication Data
US 2017/0090030 A1  Mar. 30, 2017

Related U.S. Application Data

(63) Continuation-in-part of application No. 14/075,904, filed on Nov. 8, 2013, now abandoned.

(51) Int. Cl.
| | |
|---|---|
| *G01S 17/36* | (2006.01) |
| *G01S 7/481* | (2006.01) |
| *G01S 7/491* | (2006.01) |

(52) U.S. Cl.
CPC ............ *G01S 17/36* (2013.01); *G01S 7/4815* (2013.01); *G01S 7/4816* (2013.01); *G01S 7/4917* (2013.01)

(58) Field of Classification Search
CPC ...... G01S 7/4917; G01S 7/491; G01S 7/4915; G01S 17/4815; G01S 17/36
See application file for complete search history.

(56) References Cited

U.S. PATENT DOCUMENTS 9,025,141 B1 * 5/2015 Soreide ................... G01S 17/36
356/5.11

* cited by examiner

*Primary Examiner* — Hwa Lee
(74) *Attorney, Agent, or Firm* — Duft Bornsen & Fettig LLP (57) ABSTRACT

Systems and methods for measuring a distance to an object. An exemplary method includes directing light beams from three or more continuous-wave lasers onto a target, and also frequency shifting the light beams split off from the lasers to generate local oscillator beams. When the reflected sensor beam (reflected off the target) and the local oscillator beams are combined, the method further includes determining optical phases of heterodynes produced by combining the light beams within the reflected sensor beam and the local oscillator beams, and determining synthetic phases by taking the difference between the optical phases of the heterodynes. The method further includes determining synthetic wavelengths based on the differences between the frequencies of the lasers. The method further includes determining a distance to the target based on the synthetic phases and the synthetic wavelengths.

20 Claims, 7 Drawing Sheets

LASER RANGING SENSORS AND METHODS THAT USE A LADDER OF SYNTHETIC WAVES HAVING INCREASING WAVELENGTHS TO CALCULATE A DISTANCE MEASUREMENT

RELATED APPLICATIONS

This non-provisional patent application is a continuation-in-part of U.S. patent application Ser. No. 14/075,904 filed on Nov. 8, 2013, which is incorporated herein by reference.

FIELD

This disclosure relates to the field of lasers, and more particularly, to laser ranging sensors that may be used in applications, such as manufacturing and/or assembly of large objects.

BACKGROUND

The term "ranging" refers to a process of determining the distance from one location to another. There are a variety of systems that are able to determine distance, such as SONAR (SOund Navigation And Ranging), RADAR (RAdio Detection And Ranging), LIDAR (LIght Detection And Ranging), and LADAR (LAser Detection And Ranging). One type of ranging technique uses travel time measurements to determine distance. For example, a sensor may transmit a sound or light pulse at a target, and measure a time until an echo is reflected off of the target to determine the distance to the object. Other types of ranging techniques use continuous sound or light waves. For example, a sensor may transmit a continuous sound or light wave at a target, which reflects off the target. When a portion of the transmitted wave and the reflected wave (of the same frequency) combine to form the interference wave, the resulting pattern of the interference wave is determined by the phase difference between the transmitted wave and the reflected wave. This phase difference can be used to determine the distance to the target.

Ranging sensors such as this may be used in the manufacture or assembly of products, such as aircraft. When parts are being assembled, precise measurements may be needed in order to assure that the parts are assembled correctly. It can be difficult to match shapes and contours of large parts during assembly, especially when they are fabricated at different locations. If laser ranging sensors are used in assembly processes, it is desirable to design the laser ranging sensors to provides measurements with a very high-precision.

SUMMARY

Embodiments described herein provide improved laser ranging sensors and methods. A system as described herein determines a ladder of synthetic waves having increasing wavelengths to calculate an accurate distance measurement to a target. An exemplary system mixes light beams from multiple continuous-wave lasers (at different frequencies) to generate a sensor beam, and directs the sensor beam at a target. The sensor beam reflected off the target results in a reflected sensor beam. A portion of the light beams from the continuous-wave lasers are split off and frequency shifted to generate local oscillator beams. When the local oscillator beams are mixed with reflected sensor beam, heterodynes are produced based on the difference between the frequency of a light beam within the reflected sensor beam and its corresponding local oscillator beam. The heterodynes carry information (e.g., amplitude and phase) of the reflected sensor beam, but at a lower frequency. Therefore, an optical phase can be determined for each of the heterodynes. The optical phases of the heterodynes may be used to determine the phases of the synthetic waves. The characteristics of the synthetic waves can then be processed to measure a distance.

The system as described herein may use a frequency comb laser to calibrate the continuous-wave lasers. The frequency comb laser generates a set of light beams that are separated in wavelength by a precise amount, which is referred to as a frequency comb. The system is able to tune the continuous-wave lasers to different teeth of the frequency comb so that the wavelengths of the continuous-wave lasers are separated by a precise amount. Also, the separation of the teeth of the frequency comb is equal to a pulse repetition frequency used within the frequency comb laser. The pulse repetition frequency may be tied to a frequency standard from a standards organization, such as National Institute of Standards and Technology (NIST). Therefore, the measurements from the system may be traceable to a NIST standard or other standard, and will be the same regardless of the environment or location of the system.

One embodiment comprises an apparatus for measuring a distance to a target. The apparatus includes a first continuous-wave laser configured to generate a first light beam, a second continuous-wave laser configured to generate a second light beam, a third continuous-wave laser configured to generate a third light beam, and a first optical combiner configured to combine the first, second, and third light beams to generate a sensor beam. The apparatus further includes a circulator device configured to direct the sensor beam from the first optical combiner to a telescope, where the telescope is configured to focus the sensor beam onto a target resulting in a reflected sensor beam. The circulator device is configured to direct the reflected sensor beam from the telescope to a second optical combiner. The apparatus further includes a first frequency shifter configured to receive a portion of the first light beam, and to frequency shift the first light beam by a first fixed amount to generate a first local oscillator beam. The apparatus further includes a second frequency shifter configured to receive a portion of the second light beam, and to frequency shift the second light beam by a second fixed amount to generate a second local oscillator beam, wherein the second fixed amount is different than the first fixed amount. The apparatus further includes a third frequency shifter configured to receive a portion of the third light beam, and to frequency shift the third light beam by a third fixed amount to generate a third local oscillator beam, wherein the third fixed amount is different than the first fixed amount and the second fixed amount. The second optical combiner is configured to combine the reflected sensor beam and the first, second, and third local oscillator beams to generate a synthetic wave beam. The apparatus further includes a first photodetector device configured to sense the synthetic wave beam to generate first output signals. The apparatus further includes a signal processor configured to process the first output signals from the first photodetector device to detect a first heterodyne produced by combination of the first local oscillator beam and the first light beam within the reflected sensor beam, to detect a second heterodyne produced by combination of the second local oscillator beam and the second light beam within the reflected sensor beam, to detect a third heterodyne produced by combination of the third local oscillator beam and the third light beam within the reflected sensor beam, and to determine optical phases for each of the first, second, and third heterodynes. The signal processor is configured to determine a first synthetic wavelength for a first synthetic wave based on a difference between a first frequency of the first light beam within the reflected sensor beam and a second frequency of the second light beam within the reflected sensor beam, to determine a first synthetic phase for the first synthetic wave based on a difference between a first optical phase of the first heterodyne and a second optical phase of the second heterodyne, and to determine a distance to the target based on the first synthetic wavelength and the first synthetic phase.

In another embodiment, the signal processor is configured to determine a second synthetic wavelength based on a difference between the first frequency of the first light beam within the reflected sensor beam and a third frequency of the third light beam within the reflected sensor beam, to determine a second synthetic phase based on a difference between the first optical phase of the first heterodyne and a third optical phase of the third heterodyne, and to determine the distance to the target based further on the second synthetic wavelength and the second synthetic phase.

In another embodiment, the apparatus includes a frequency comb laser configured to generate a set of light beams comprising a frequency comb, and another optical combiner configured to combine the set of light beams from the frequency comb laser with the first, second, and third light beams from the first, second, and third continuous-wave lasers. The apparatus further includes a phase-lock controller configured to compare the frequencies of the first, second, and third light beams with the frequency comb generated by the frequency comb laser, and to tune the frequencies of the first, second, and third light beams from the first, second, and third continuous-wave lasers to different teeth of the frequency comb.

Another embodiment comprises a method of measuring a distance to a target. The method includes generating a sensor beam by combining a first light beam, a second light beam, and a third light beam from a first continuous-wave laser, a second continuous-wave laser, and a third continuous-wave laser, respectively, and focusing the sensor beam onto the target resulting in a reflected sensor beam. The method further includes frequency shifting the first light beam by a first fixed amount to generate a first local oscillator beam, frequency shifting the second light beam by a second fixed amount to generate a second local oscillator beam (wherein the second fixed amount is different than the first fixed amount), and frequency shifting the third light beam by a third fixed amount to generate a third local oscillator beam (wherein the third fixed amount is different than the first fixed amount and the second fixed amount). The method further includes combining the reflected sensor beam and the local oscillator beams to generate a synthetic wave beam. The method further includes sensing the synthetic wave beam with a first photodetector device, and processing output from the first photodetector device to detect a first heterodyne produced by combination of the first local oscillator beam and the first light beam within the reflected sensor beam, to detect a second heterodyne produced by combination of the second local oscillator beam and the second light beam within the reflected sensor beam, and to detect a third heterodyne produced by combination of the third local oscillator beam and the third light beam within the reflected sensor beam. The method further includes determining optical phases for each of the first, second, and third heterodynes, determining a first synthetic wavelength for a first synthetic wave based on a difference between a first frequency of the first light beam and a second frequency of the second light beam, determining a first synthetic phase for the first synthetic wave based on a difference between a first optical phase of the first heterodyne and a second optical phase of the second heterodyne, and determining the distance to the target based on the first synthetic wavelength and the first synthetic phase.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
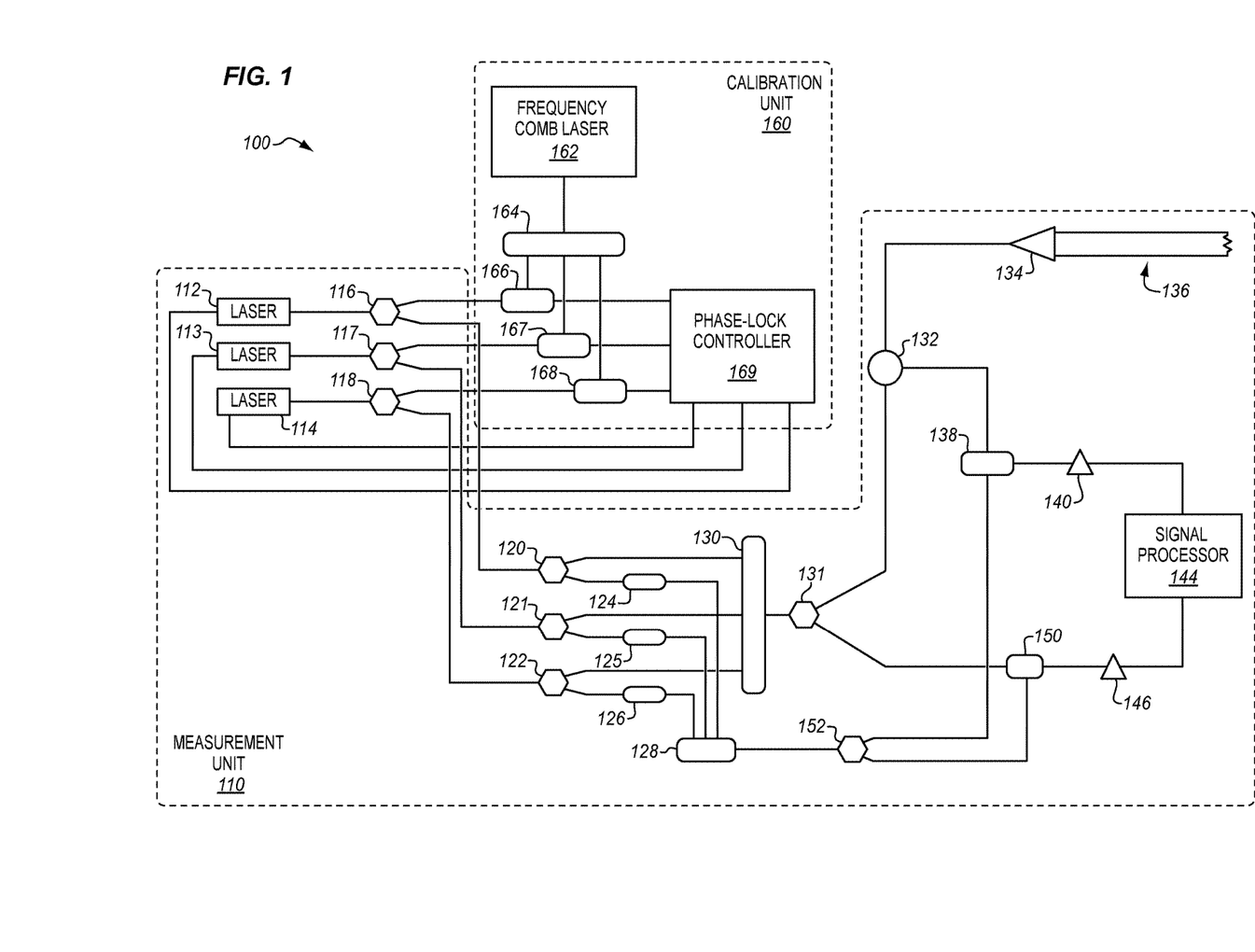
FIG. 1 illustrates a laser ranging sensor in an exemplary embodiment.

FIG. 1 illustrates a laser ranging (e.g., LADAR) sensor 100 in an exemplary embodiment. Sensor 100 is operable to perform distance or ranging measurements from the sensor 100 to a target (not shown in FIG. 1). For example, sensor 100 may be used in assembly or manufacturing processes to precisely measure large objects, such as parts of an aircraft. If large objects such as this are manufactured at different locations, problems may occur during assembly if the shapes and contours of matching parts are not precisely formed. Therefore, laser ranging sensors of the type described herein may be used at different locations to precisely measure parts as they are manufactured or assembled.

Figure 2:
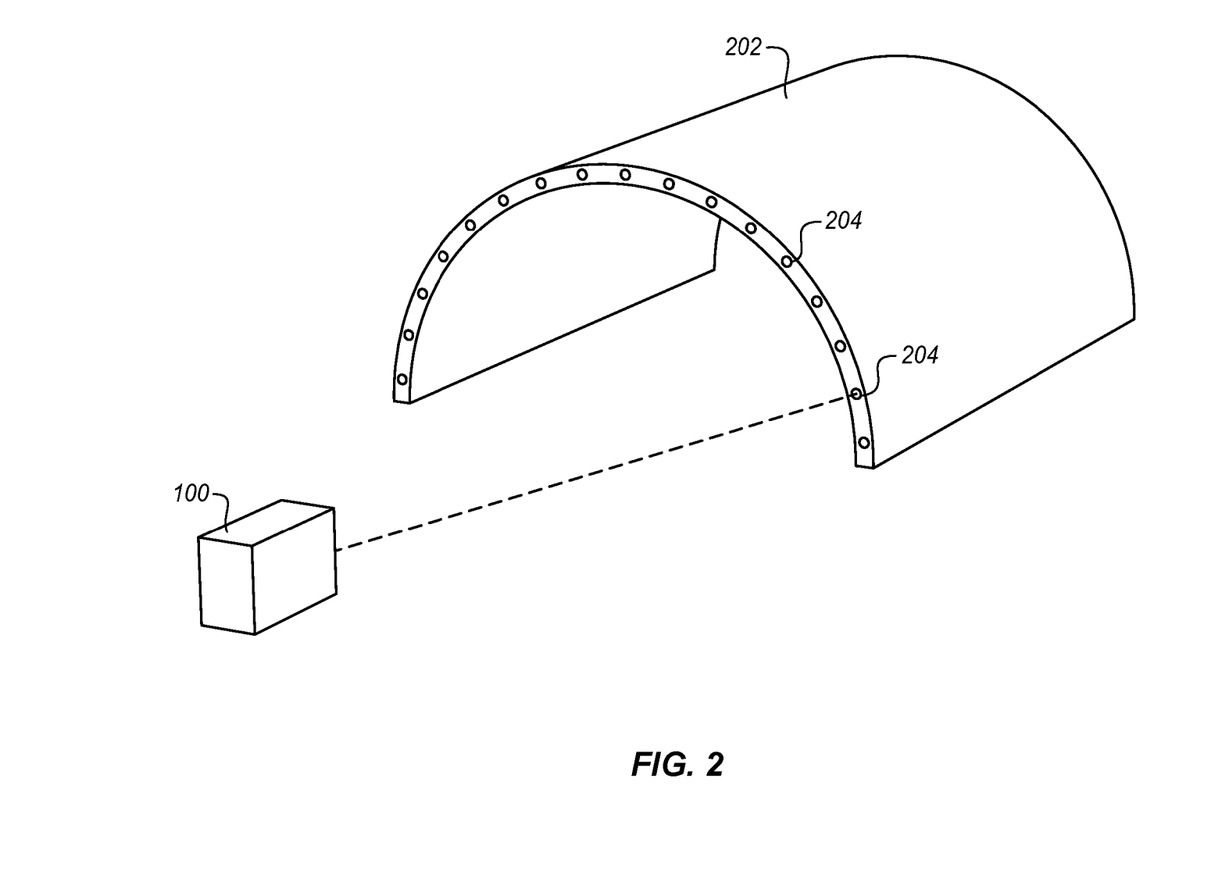
FIG. 2 illustrates a laser ranging sensor measuring a distance to a target in an exemplary embodiment.

FIG. 2 illustrates sensor 100 measuring a distance to a target in an exemplary embodiment. Server 100 is aimed at an object 202, such as a part of an aircraft being assembled or manufactured. Sensor 100 is able to measure a distance to one or more targets 204 on object 202. For example, sensor 100 may measure the distance to an edge of a part being assembled. Targets 204 may comprise retro-reflective targets or non-cooperative targets that do not include retro-reflectors.

In the embodiment shown in FIG. 1, sensor 100 includes a measurement unit 110 and a calibration unit 160. Measurement unit 110 includes components that measure a distance to a target using synthetic wave interferometry. Interferometry is a technique for superimposing waves (e.g., light waves) and extracting information from the combination of the waves. As a simplified example of using interferometry, a light beam is split into two identical beams by a beam splitter. Each of the beams travels on a different path, and is recombined at a detector. If there are differences in the paths traveled by the beams (e.g., distance), then a phase difference is created between the beams. The phase difference between the beams may be used to determine a length of a path and consequently a distance to a target.

As will be described in more detail below, measurement unit 110 combines light beams from multiple lasers at closely-spaced light frequencies to direct a beam at the target. The light reflected off the target is captured. The closely-spaced light frequencies in the reflected sensor beam will generate a set of beat frequencies, which are referred to herein as a ladder or set of "synthetic waves". Measurement unit 110 is able to determine the phase (referred to herein as a synthetic phase) of each synthetic wave, and then measure a distance to the target based on the phases of the synthetic waves. Because measurement unit 110 uses a set of lasers having different frequencies, a ladder of synthetic phases is created from the ladder of synthetic waves. One of the synthetic waves (the wave having the longest wavelength) is a direct measurement of the distance to the target (assuming the target is less than one wavelength away), but the accuracy of the measurement may not be sufficient. The accuracy of the distance measurement from this synthetic wave is sufficient to locate the absolute number of wavelengths for the next synthetic wave. The phase of the next synthetic wave (the wave having the next longest wavelength) provides an increase in the accuracy of the distance measurement. This process may be repeated for each phase of the ladder until the desired accuracy is obtained.

Calibration unit 160 includes components that operate to calibrate measurement unit 110 for performing distance measurements. As described in more detail below, calibration unit 160 uses a frequency comb laser to tune continuous-wave (CW) lasers within measurement unit 110. A frequency comb laser is a light source with a spectrum comprising a series of discrete and equally spaced modes. The continuous-wave lasers within measurement unit 110 are tuned to different teeth of the frequency comb. Because the teeth of the frequency comb are at precise frequencies, the CW lasers of measurement unit 110 will be tuned to precise frequencies.

To create the ladder of synthetic waves, measurement unit 110 includes three measurement channels in FIG. 1 each having a CW laser 112-114. Lasers 112-114 are each tuned to a different wavelength. For example, laser 112 may be tuned to $\lambda_1$, laser 113 may be tuned to $\lambda_2$, and laser 114 may be tuned to $\lambda_3$. Wavelength $\lambda_1$ may be about 1550 nanometers (nm), wavelength $\lambda_2$ may be about 1550.08 nm, and $\lambda_3$ may be about 1550.8 nm. While different wavelengths may be selected as desired for a particular application, there should be a difference in the wavelengths from each of the lasers 112-114. The different wavelengths enable generation of an interference that will be processed to determine a range to a target.

For the first measurement channel, laser 112 is coupled to a beam splitter 116 by an optical fiber. Splitter 116 is coupled to another beam splitter 120 by an optical fiber. Splitter 116 is configured to split a light beam from laser 112. A portion of the light beam from laser 112 travels to splitter 120 within measurement unit 110, and a portion of the light beam travels to an optical combiner 166 within calibration unit 160 (which will be described later). Splitter 120 connects to a frequency shifter 124 via an optical fiber, and connects to an optical combiner 130 via an optical fiber. Splitter 120 is configured to split the light beam from laser 112 again. A portion of the light beam from laser 112 travels to frequency shifter 124, and a portion of the light beam travels to combiner 130. Frequency shifter 124 is configured to frequency shift the light beam from laser 112 by a fixed amount. For example, frequency shifter 124 may shift the frequency of the light beam from laser 112 by 170 Hz. Some examples of frequency shifter 124 are an Acousto-Optic Modulator (AOM) and a Doppler shifter. The frequency-shifted light beam is referred to as the local oscillator beam for the first measurement channel. The local oscillator beam for the first measurement channel then travels from frequency shifter 124 to an optical combiner 128.

For the second measurement channel, laser 113 is coupled to a beam splitter 117 by an optical fiber. Splitter 117 is coupled to another beam splitter 121 by an optical fiber. Splitter 117 is configured to split a light beam from laser 113. A portion of the light beam from laser 113 travels to splitter 121 within measurement unit 110, and a portion of the light beam travels to an optical combiner 167 within calibration unit 160. Splitter 121 connects to a frequency shifter 125 via an optical fiber, and connects to combiner 130 via an optical fiber. Splitter 121 is configured to split the laser beam from laser 113 again. A portion of the light beam from laser 113 travels to frequency shifter 125, and a portion of the light beam travels to combiner 130. Frequency shifter 125 is configured to frequency shift the light beam from laser 113 by a fixed amount (and different than frequency shifter 124) to create a local oscillator beam for the second measurement channel. The local oscillator beam for the second measurement channel then travels to combiner 128.

For the third measurement channel, laser 114 is coupled to a beam splitter 118 by an optical fiber. Splitter 118 is coupled to another beam splitter 122 by an optical fiber. Splitter 118 is configured to split a light beam from laser 114. A portion of the light beam from laser 114 travels to splitter 122 within measurement unit 110, and a portion of the light beam travels to an optical combiner 168 within calibration unit 160. Splitter 122 connects to a frequency shifter 126 via an optical fiber, and connects to combiner 130 via an optical fiber. Splitter 122 is configured to split the laser beam from laser 114 again. A portion of the light beam from laser 114 travels to frequency shifter 126, and a portion of the light beam travels to combiner 130. Frequency shifter 126 is configured to frequency shift the light beam from laser 114 by a fixed amount (and different than frequency shifters 124 and 125) to create a local oscillator beam for the third measurement channel. The local oscillator beam for the third measurement channel then travels to combiner 128.

Although three measurement channels are shown in FIG. 1, measurement unit 110 may include more channels. Three or more measurement channels are used in measurement unit 110 to provide the precision desired for the distance measurements. Also, although three frequency shifters 124-126 are shown in FIG. 1, a shared frequency shifter unit may be implemented to create the local oscillator beams as described above.

The light beams from the three measurement channels are combined or mixed within combiner 130 to form a sensor beam. Combiner 130 connects to a beam splitter 131 via an optical fiber. Splitter 131 is configured to split the sensor beam. A portion of the sensor beam travels to a circulator 132, and a portion of the sensor beam travels to an optical combiner 150 of a reference channel, which is described in more detail below. The sensor beam travels through circulator 132 to a telescope 134. Telescope 134 is configured to focus the sensor beam toward the target (not shown in FIG. 1) being measured.

Telescope 134 captures the sensor beam that is reflected off of the target, which is referred to as reflected sensor beam 136. Circulator 132 then directs the reflected sensor beam 136 to an optical combiner 138. Concurrently, the local oscillator beams for the three measurement channels are combined or mixed within combiner 128 to form a collective local oscillator beam. The collective local oscillator beam travels from combiner 128 to a beam splitter 152. Splitter 152 is configured to split the collective local oscillator beam. A portion of the collective local oscillator beam travels to combiner 138, and a portion of the collective local oscillator beam travels to combiner 150. Combiner 138 is configured to combine or mix the reflected sensor beam 136 with the collective local oscillator beam to generate a "synthetic wave" beam. The synthetic wave beam is projected onto a photodetector device 140. Photodetector device 140 may comprise a single photodetector element, or may comprise an array of photodetector elements, such as in a digital camera. Photodetector device 140 is configured to sense the light from the synthetic wave beam, and provide output signals to a signal processor 144.

Measurement unit 110 also includes a reference channel. For the reference channel, the portion of the sensor beam split from splitter 131 travels to combiner 150. Concurrently, a portion of the collective local oscillator beam from splitter 152 travels to combiner 150. Combiner 150 is configured to combine or mix the sensor beam with the collective local oscillator beam to generate a reference "synthetic wave" beam. The reference synthetic wave beam is projected onto a photodetector device 146. Photodetector device 146 is configured to sense the light from the reference synthetic wave beam, and provide output signals to signal processor 144.

Calibration unit 160 includes a frequency comb laser 162 that connects to a beam splitter 164 via an optical fiber. Splitter 164 connects to combiners 166-168 via optical fibers. Splitter 164 is configured to split light beams from frequency comb laser 162, so that a portion of the light beams from frequency comb laser 162 travels to combiners 166-168. Combiners 166-168 are each configured to combine or mix the light beams from frequency comb laser 162 with light beams from their respective measurement channels. Combiners 166-168 each connect with a phase-lock controller 169. Controller 169 in turn connects with each of the lasers 112-114.

The architecture of sensor 100 as shown in FIG. 1 is just one example. There may be variations to this architecture that allow sensor 100 to be operated as described below.

Figure 3:
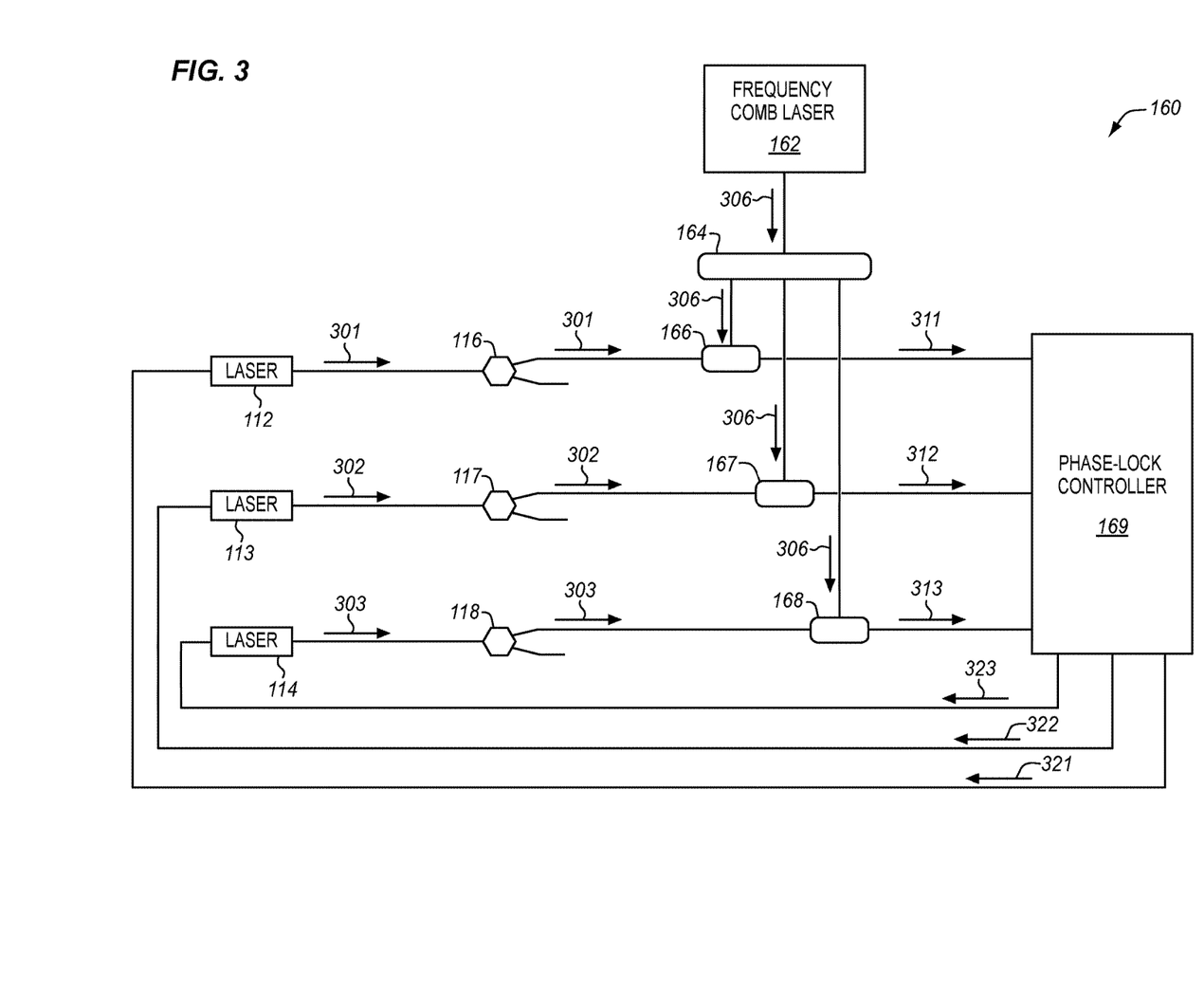
FIG. 3 illustrates a calibration unit operating to calibrate a measurement unit in an exemplary embodiment.

The following describes an exemplary operation of sensor 100. To perform a precise distance measurement, measurement unit 110 within sensor 100 is calibrated by calibration unit 160. FIG. 3 illustrates calibration unit 160 operating to calibrate measurement unit 110 in an exemplary embodiment. Lasers 112-114 transmit light beams 301-303 that travel to splitters 116-118, respectively. Splitter 116 provides a portion of the light beam 301 from laser 112 to combiner 166, splitter 117 provides a portion of the light beam 302 from laser 113 to combiner 167, and splitter 118 provides a portion of the light beam 303 from laser 114 to combiner 168.

Concurrently, frequency comb laser 162 generates a set of light beams 306 that comprises a frequency comb. To generate a frequency comb, laser 162 has a light source (e.g., a femtosecond laser) that is able to generate ultra-short pulses of light. The light source emits a regular train of short light pulses separated in time by a repetition period $T_{rep}$. The electromagnetic field of the carrier light wave, which makes up these pulses, oscillates at a much higher frequency. The train of pulses from the light source consists of a comb of optical frequencies with a spacing equal to the pulse repetition frequency, $f_{rep}$. The carrier signal, $f_c$, is amplitude modulated, which produces sidebands in the frequency domain with a spacing equal to the modulation frequency, $f_{rep}$. In the frequency domain, the sidebands resemble teeth on a comb that are centered about the carrier frequency. The frequency of any one of the comb teeth (also referred to as comb elements) is:

$$f = n \times f_{rep} + f_o,$$

where n is an integer, $f_{rep}$ is the pulse repetition frequency, and $f_o$ is the carrier offset frequency.

Frequency comb laser 162 therefore generates a set of light beams 306 separated in wavelength by the pulse repetition frequency used within laser 162. Splitter 164 receives the light beams 306 from laser 162, and provides a portion of the light beams 306 to each of combiners 166-168. Combiner 166 combines the light beams from frequency comb laser 162 with the light beam from laser 112 of the first measurement channel, and provides the combined light beam 311 to phase-lock controller 169. Combiner 167 combines the light beams from frequency comb laser 162 with the light beam from laser 113 of the second measurement channel, and provides the combined light beam 312 to phase-lock controller 169. Similarly, combiner 168 combines the light beams from frequency comb laser 162 with the light beam from laser 114 of the third measurement channel, and provides the combined light beam 313 to phase-lock controller 169.

Phase-lock controller 169 is able to compare the frequencies of lasers 112-114 to the set of light beams generated by frequency comb laser 162. Phase-lock controller 169 is then able to tune lasers 112-114 to individual teeth of the frequency comb by sending control signals 321-323 to lasers 112-114, respectively. For example, phase-lock controller 169 selects a tooth on the frequency comb, and then adjusts the output of laser 112 to match (within an acceptable tolerance) the frequency of the selected tooth of the frequency comb. Phase-lock controller 169 performs a similar process for each of lasers 112-114 until each laser is operating a desired frequency. This advantageously tunes lasers 112-114 to exact wavelengths, with known differences between the wavelengths of each laser 112-114.

Also, by tuning measurement unit 110 as described above, distances measured by measurement unit 110 may be traceable to a standard, such as the National Institute of Standards and Technology (NIST). The teeth of the comb from frequency comb laser 162 are separated by the pulse repetition frequency of frequency comb laser 162, and lasers 112-114 are precisely tuned to teeth of the frequency comb. Therefore, if the pulse repetition frequency of frequency comb laser 162 can be tied to a known frequency standard, then distances measured from measurement unit 110 may be traceable to the standard.

Figure 4:
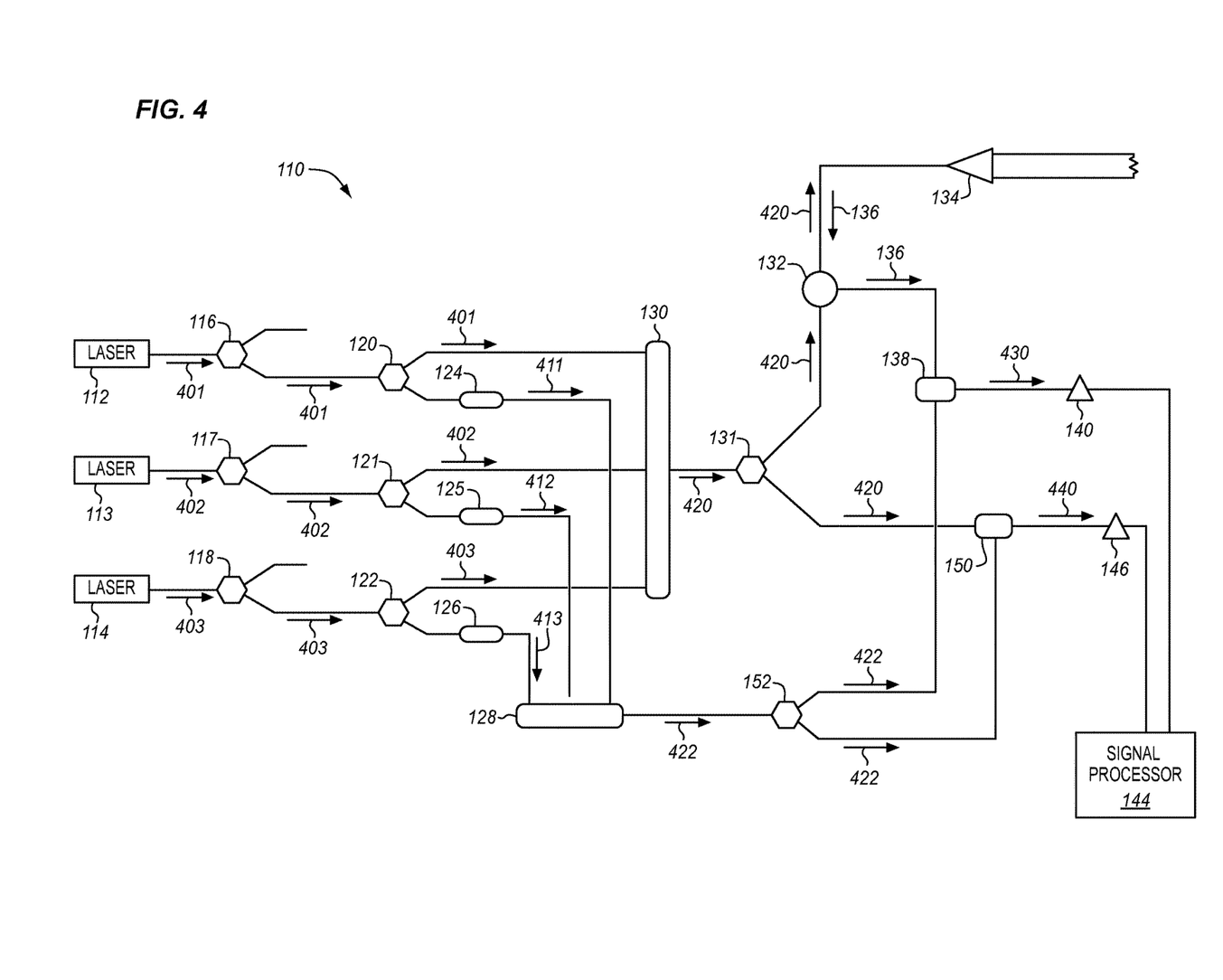
FIG. 4 illustrates a measurement unit operating to perform a distance measurement in an exemplary embodiment.

After calibration, measurement unit 110 is able to perform a distance measurement to a target. FIG. 4 illustrates measurement unit 110 operating to perform a distance measurement in an exemplary embodiment. Looking at the first measurement channel, laser 112 transmits a light beam 401 to splitter 116, which provides a portion of the light beam 401 to splitter 120. Splitter 120 in turn provides a portion of the light beam 401 to combiner 130, and a portion of the light beam 401 to frequency shifter 124. Frequency shifter 124 shifts the frequency of the light beam 401 by a known amount (e.g., 170 Hz) to generate a local oscillator beam 411 for the first measurement channel. The local oscillator beam 411 for the first measurement channel then travels from frequency shifter 124 to combiner 128.

A similar process takes place for the second and third measurement channels. For the second measurement channel, laser 113 transmits a light beam 402 to splitter 117, which provides a portion of the light beam 402 to splitter 121. Splitter 121 in turn provides a portion of the light beam 402 to combiner 130, and a portion of the light beam 402 to frequency shifter 125. Frequency shifter 125 shifts the frequency of the light beam 402 by a known amount (different from frequency shifter 124) to generate the local oscillator beam 412 for the second measurement channel. The local oscillator beam 412 for the second measurement channel then travels from frequency shifter 125 to combiner 128. For the third measurement channel, laser 114 transmits a light beam 403 to splitter 118, which provides a portion of the light beam 403 to splitter 122. Splitter 122 in turn provides a portion of the light beam 403 to combiner 130, and a portion of the light beam 403 to frequency shifter 126. Frequency shifter 126 shifts the frequency of the light beam 403 by a known amount (different from frequency shifters 124 and 125) to generate the local oscillator beam 413 for the third measurement channel. The local oscillator beam 413 for the third measurement channel then travels from frequency shifter 126 to combiner 128.

The light beams 401-403 for the measurement channels are combined or mixed within combiner 130 to generate a sensor beam 420 for measurement unit 110. Splitter 131 splits sensor beam 420. A portion of sensor beam 420 travels to telescope 134 through circulator 132, and a portion of sensor beam 420 travels to combiner 150 of the reference channel. Telescope 134 is then used to focus the sensor beam 420 toward the target being measured. Telescope 134 captures a reflection of the sensor beam 420 off the target, which is referred to as a reflected sensor beam 136. Reflected sensor beam 136 travels back through circulator 132 to combiner 138. Also, the local oscillator beams 411-413 for the measurement channels are combined or mixed within combiner 128 to generate the collective local oscillator beam 422. The collective local oscillator beam 422 is split by splitter 152. A portion of collective local oscillator beam 422 travels to combiner 138, and a portion of collective local oscillator beam 422 travels to combiner 150.

Combiner 138 receives reflected sensor beam 136 and collective local oscillator beam 422, and combines or mixes these beams to generate a synthetic wave beam 430. Synthetic wave beam 430 then travels to photodetector device 140, where photodetector device 140 is configured to convert light from the synthetic wave beam 430 into electrical signals. Photodetector device 140 then provides the electrical signals to signal processor 144. The electrical signals comprise multiple samples of synthetic wave beam 430 over time.

Figure 5:
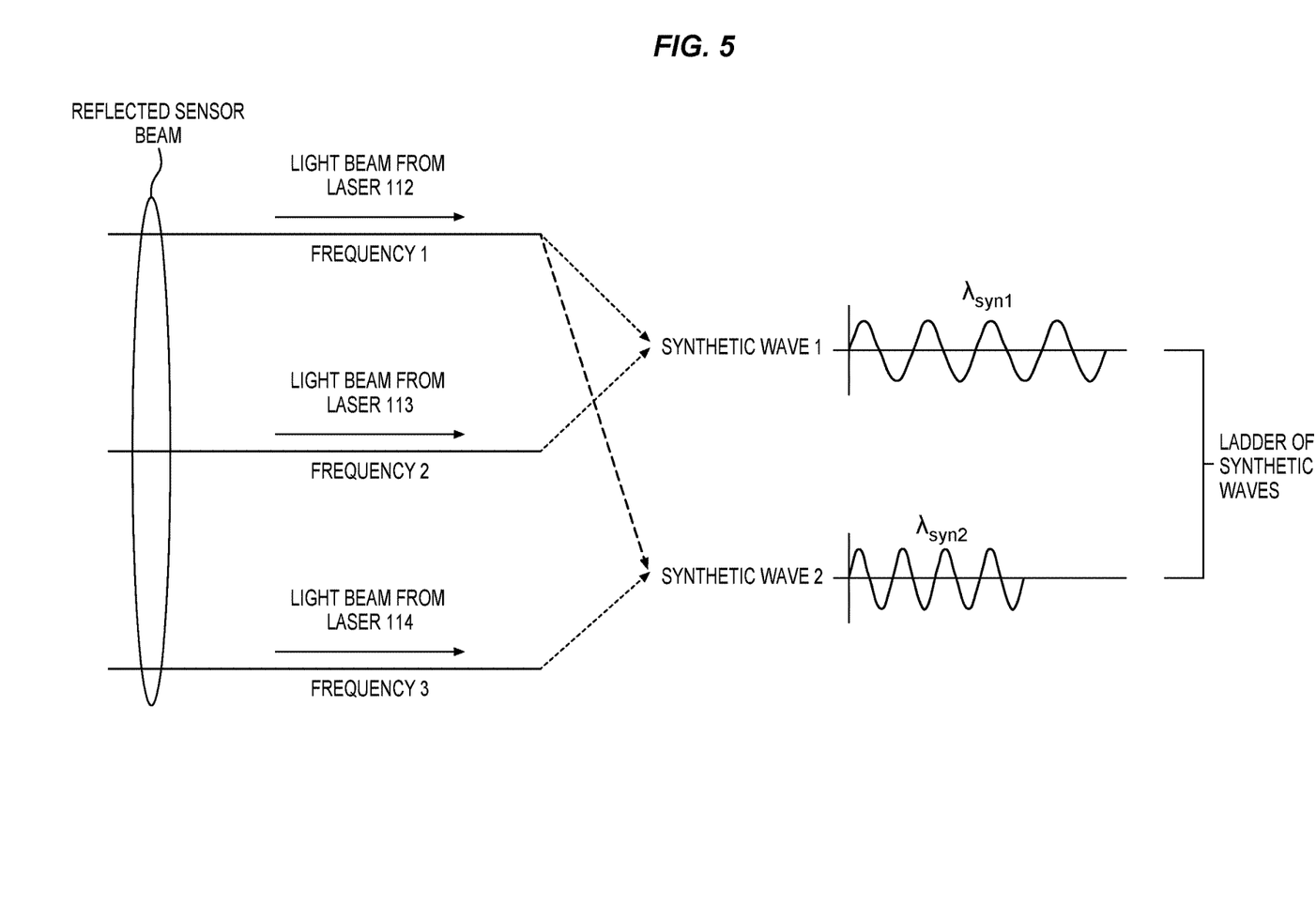
FIG. 5 illustrates a ladder of synthetic waves in an exemplary embodiment.

Signal processor 144 receives the output signals from photodetector device 140, and is able to process the output signals from photodetector device 140 to identify a ladder of synthetic waves from the synthetic wave beam 430. The ladder of synthetic waves is created by the frequency differences between lasers 112-114. FIG. 5 illustrates the ladder of synthetic waves in an exemplary embodiment. A first synthetic wave is created by the frequency difference between the light beam from laser 112 and the light beam from laser 113 in the reflected sensor beam 136. When these two light beams are combined, the combination creates a wave that oscillates at a beat frequency, which is referred to as the first synthetic wave (labeled synthetic wave 1 in FIG. 5). The frequency of the first synthetic wave will be the difference in frequency between the light beam from laser 112 and the light beam from laser 113. A second synthetic wave is created by the frequency difference between the light beam from laser 112 and the light beam from laser 114 in the reflected sensor beam 136. When these two light beams are combined, the combination creates a wave that oscillates at a beat frequency, which is referred to as the second synthetic wave (labeled synthetic wave 2 in FIG. 5). The frequency of the second synthetic wave will be the difference in frequency between the light beam from laser 112 and the light beam from laser 114. Yet another synthetic wave will be created by the frequency difference between the light beam from laser 112 and the light beam from laser 113 in the reflected sensor beam 136. However, the frequency of this synthetic wave will be close to the frequency of the second synthetic wave described above, so it may be ignored.

The ladder of synthetic waves in FIG. 5 includes two synthetic waves. However, if more lasers are added to measurement unit 110, then more synthetic waves are created for the ladder. For example, if a fourth CW laser is added, then a third synthetic wave will be created by the frequency difference between the light beam from laser 112 and the light beam from the fourth laser in the reflected sensor beam 136. If a fifth CW laser is added, then a fourth synthetic wave will be created by the frequency difference between the light beam from laser 112 and the light beam from the fifth laser in the reflected sensor beam 136. The number of synthetic waves in the ladder may depend on the accuracy desired for the distance measurements, the distance between sensor 100 and the target, etc.

Because signal processor 144 knows the frequencies of the synthetic waves, signal processor 144 also knows the wavelength for each synthetic wave. The wavelength of the first synthetic wave is labeled $\lambda_{syn1}$, and the wavelength of the second synthetic wave is labeled $\lambda_{syn2}$. In order to get a distance measurement out of the synthetic waves, signal processor 144 determines the phase of the synthetic waves in the reflected sensor beam 136, as the synthetic waves will carry information (e.g., amplitude and phase) of the reflected sensor beam 136. In measurement unit 110 however, the frequencies of one or more of the synthetic waves may be too high to process with conventional signal processing. To identify the phases of the synthetic waves, signal processor 144 processes information on heterodynes created for each measurement channel, as is described below.

Figure 6:
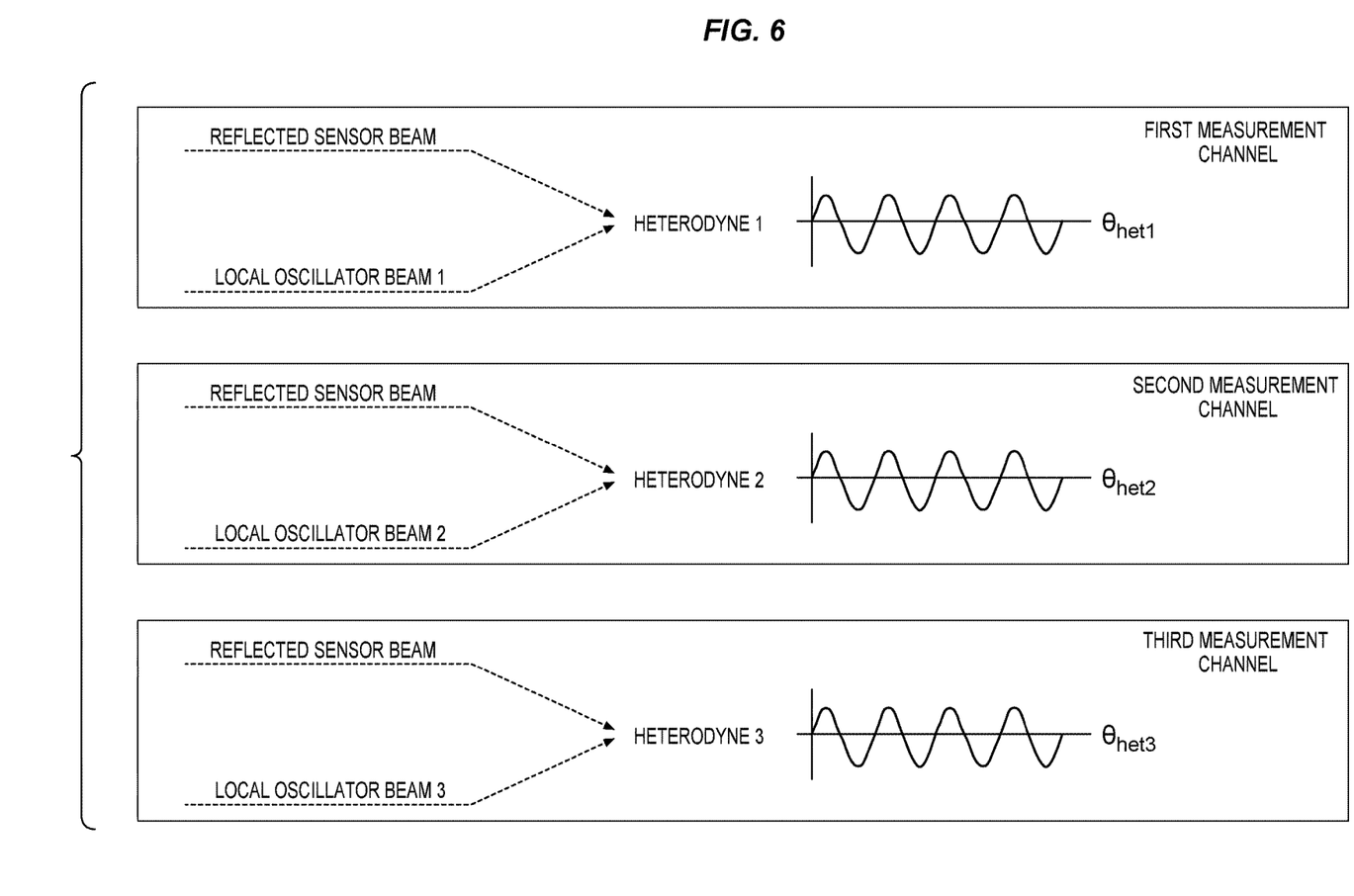
FIG. 6 illustrates heterodynes created for the measurement channels in an exemplary embodiment.

FIG. 6 illustrates heterodynes created for the measurement channels in an exemplary embodiment. The reflected sensor beam 136 is a combination of the light beams from lasers 112-114. When the reflected sensor beam 136 is combined with the local oscillator beams, the local oscillator beam for the first measurement channel will interfere with the light beam of the first measurement channel to create a first heterodyne that oscillates at a much lower beat frequency. The frequency of the first heterodyne (heterodyne 1 in FIG. 6) will be the difference in frequency between the light beam from laser 112 and the local oscillator beam for the first measurement channel (as determined by frequency shifter 124 in FIG. 1). The first heterodyne carries information (e.g., amplitude and phase) of the reflected sensor beam 136 that relates to the first measurement channel. The frequency of the first heterodyne is in the RF spectrum (e.g., 170 Hz), so signal processor 144 can easily extract an optical phase ($\theta_{het1}$) for the first heterodyne.

In a similar manner, the local oscillator beam for the second measurement channel will interfere with the light beam of the second measurement channel to create a second heterodyne that oscillates at a much lower beat frequency. The frequency of the second heterodyne (heterodyne 2 in FIG. 6) will be the difference in frequency between the light beam from laser 113 and the local oscillator beam for the second measurement channel (as determined by frequency shifter 125 in FIG. 1). The second heterodyne carries information (e.g., amplitude and phase) of the reflected sensor beam 136 that relates to the second measurement channel. Signal processor 144 can extract an optical phase ($\theta_{het2}$) for the second heterodyne.

The local oscillator beam for the third measurement channel will interfere with the light beam of the third measurement channel to create a third heterodyne that oscillates at a much lower beat frequency. The frequency of the third heterodyne (heterodyne 3 in FIG. 6) will be the difference in frequency between the light beam from laser 114 and the local oscillator beam for the third measurement channel (as determined by frequency shifter 126 in FIG. 1). The third heterodyne carries information (e.g., amplitude and phase) of the reflected sensor beam 136 that relates to the third measurement channel. Signal processor 144 can extract an optical phase ($\theta_{het3}$) for the third heterodyne.

After determining the optical phases for the heterodynes of the measurement channels, signal processor 144 can determine the phases of the synthetic waves based on the optical phases extracted from the heterodynes. The first synthetic wave is created based on a frequency difference between the light beam from laser 112 and the light beam from laser 113 within the reflected sensor beam 136 (see FIG. 5). Signal processor 144 can determine a phase ($\theta_{syn1}$) for the first synthetic wave based on the difference between the optical phase of the first heterodyne and the optical phase of the second heterodyne. The second synthetic wave is created based on a frequency difference between the light beam from laser 112 and the light beam from laser 114 within the reflected sensor beam 136 (see FIG. 5). Signal processor 144 can determine a phase ($\theta_{syn2}$) for the second synthetic wave based on the difference between the optical phase of the first heterodyne and the optical phase of the third heterodyne. Therefore, signal processor 144 is able to calculate a phase for each of the synthetic waves based on the optical phases extracted from the heterodynes.

At this stage, signal processor 144 has a wavelength ($\lambda_{syn1}$) and phase ($\theta_{syn1}$) for the first synthetic wave, and a wavelength ($\lambda_{syn2}$) and phase ($\theta_{syn2}$) for the second synthetic wave. With this information for the synthetic waves, signal processor 144 is able to calculate a distance to the target. Signal processor 144 first processes the data for the synthetic wave having the longest wavelength (assume for this example the synthetic wave having the longest wavelength is the first synthetic wave). It is assumed in this embodiment that the distance from sensor 100 to the target is less than the wavelength of the longest wavelength synthetic wave. Signal processor 144 uses the following equation to calculate a distance:

$$Z = \lambda * \theta,$$

where Z is a distance, $\lambda$ is wavelength (e.g., nm), and $\theta$ is phase (e.g., cycles).

Signal processor 144 may then multiply the wavelength ($\lambda_{syn1}$) for the first synthetic wave and the phase ($\theta_{syn1}$) for the first synthetic wave to get a distance value ($Z_1$). This distance value represents where the target is located in the period of the first synthetic wave. For example, if the wavelength of the first synthetic wave is one meter and the phase of the first synthetic wave is 0.5 cycles, then signal processor 144 calculates the distance to the target to be 0.5 meters.

Next, signal processor 144 processes the data for the next shorter synthetic wave in the ladder (assume for this example the second synthetic wave is next in the ladder). Signal processor 144 calculates an estimated phase ($\theta_{est}$) of the second synthetic wave by dividing the distance value ($Z_1$) calculated for the first synthetic wave from the wavelength ($\lambda_{syn2}$) the second synthetic wave. The estimated phase ($\theta_{est}$) has both an integer and fractional component. Signal processor 144 adds the integer portion of the estimated phase ($\theta_{est}$) to the phase ($\theta_{syn2}$) measured for the second synthetic wave to get a total phase ($\theta_{syn2total}$) for the second synthetic wave. The total phase ($\theta_{syn2total}$) for the second synthetic wave represents the number of cycles that occur on the second synthetic wave between the sensor 100 and the target. Signal processor 144 then multiplies the total phase ($\theta_{syn2total}$) for the second synthetic wave and the wavelength ($\lambda_{syn2}$) for the second synthetic wave to calculate a more accurate distance value ($Z_2$).

For example, assume that signal processor 144 calculated a value of 0.5 meters for $Z_1$, and the wavelength ($\lambda_{syn2}$) of the second synthetic wave is 10 mm. Signal processor 144 then divides 0.5 meters by 10 mm resulting in a value of 50, which is the estimated phase ($\theta_{est}$) of the second synthetic wave. Signal processor 144 then adds the integer portion of the estimated phase ($\theta_{est}$) to the phase ($\theta_{syn2}$) measured for the second synthetic wave. Assume for this example that the phase ($\theta_{syn2}$) measured for the second synthetic wave is 0.57. The total phase ($\theta_{syn2total}$) for the second synthetic wave is therefore the sum of the estimated phase ($\theta_{est}$) and the phase ($\theta_{syn2}$) measured for the second synthetic wave, which is 50.57. Signal processor 144 then multiplies the total phase ($\theta_{syn2total}$) for the second synthetic wave with the wavelength ($\lambda_{syn2}$) for the second synthetic wave to calculate a distance value ($Z_2$). If the wavelength ($\lambda_{syn2}$) for the second synthetic wave is 10 mm, then the product of the total phase ($\theta_{syn2total}$) for the second synthetic wave and the wavelength ($\lambda_{syn2}$) is 0.5057 meters (50.57*10 mm). This distance measurement has a higher resolution than the prior distance measurement for the longer wavelength, which was 0.5 meters.

Signal processor 144 may repeat the above process for each synthetic wave in the ladder that has the next shorter wavelength until the distance value (Z) has a desired accuracy.

Signal processor 144 may also process data from the reference channel to determine if any unintended phase is being added into the system by frequency shifters 124-126. The sensor beam 420 (see FIG. 4) from combiner 130 travels to combiner 150. Combiner 150 also receives the collective local oscillator beam 422 from combiner 128 (through splitter 152), and combines or mixes these beams to generate a reference synthetic wave beam 440. Reference synthetic wave beam 440 then travels to photodetector device 146. Photodetector device 146 senses the light from the reference synthetic wave beam 440, and generates electrical signals representing the reference synthetic wave beam 440. Photodetector device 146 then provides the electrical signals to signal processor 144.

Signal processor 144 processes the electrical signals from photodetector device 146 to detect heterodynes in the reference synthetic wave beam 440 (see FIG. 4). When the sensor beam 440 is combined with the local oscillator beams, the local oscillator beam for the first measurement channel will interfere with the light beam from laser 112 in the sensor beam to create a heterodyne in the reference channel, which is referred to as the fourth heterodyne. The frequency of this heterodyne will be the difference in frequency between the light beam from laser 112 and the local oscillator beam for the first measurement channel (as determined by frequency shifter 124 in FIG. 1). Signal processor 144 can extract an optical phase ($\theta_{het4}$) for the fourth heterodyne of the reference channel.

In a similar manner, the local oscillator beam for the second measurement channel will interfere with the light beam from laser 113 in the sensor beam to create another heterodyne in the reference channel, referred to as the fifth heterodyne. The frequency of this heterodyne will be the difference in frequency between the light beam from laser 113 and the local oscillator beam for the second measurement channel (as determined by frequency shifter 125 in FIG. 1). Signal processor 144 can extract an optical phase ($\theta_{het5}$) for the fifth heterodyne of the reference channel.

The local oscillator beam for the third measurement channel will interfere with the light beam of laser 114 in the sensor beam to create yet another heterodyne in the reference channel, which is referred to as the sixth heterodyne. The frequency of this heterodyne will be the difference in frequency between the light beam from laser 114 and the local oscillator beam for the third measurement channel (as determined by frequency shifter 126 in FIG. 1). Signal processor 144 can extract an optical phase ($\theta_{het6}$) for the sixth heterodyne of the reference channel.

Signal processor 144 can then compare the heterodynes calculated in the measurement channels with the heterodynes in the reference channels to determine if any extraneous phase is being introduced into the system by frequency shifters 124-126. For example, signal processor 144 can compare the optical phase ($\theta_{het1}$) of the first heterodyne of the first measurement channel with the optical phase ($\theta_{het4}$) of the fourth heterodyne of the reference channel. Signal processor 144 can compare the optical phase ($\theta_{het2}$) of the second heterodyne of the second measurement channel with the optical phase ($\theta_{het5}$) of the fifth heterodyne of the reference channel. Signal processor 144 can also compare the optical phase ($\theta_{het3}$) of the third heterodyne of the third measurement channel with the optical phase ($\theta_{het6}$) of the sixth heterodyne of the reference channel. If there are any discrepancies, signal processor 144 will subtract the optical phase of the reference channel from the optical phase of the measurement channels to correct the heterodynes in the measurement channels.

Figure 7:
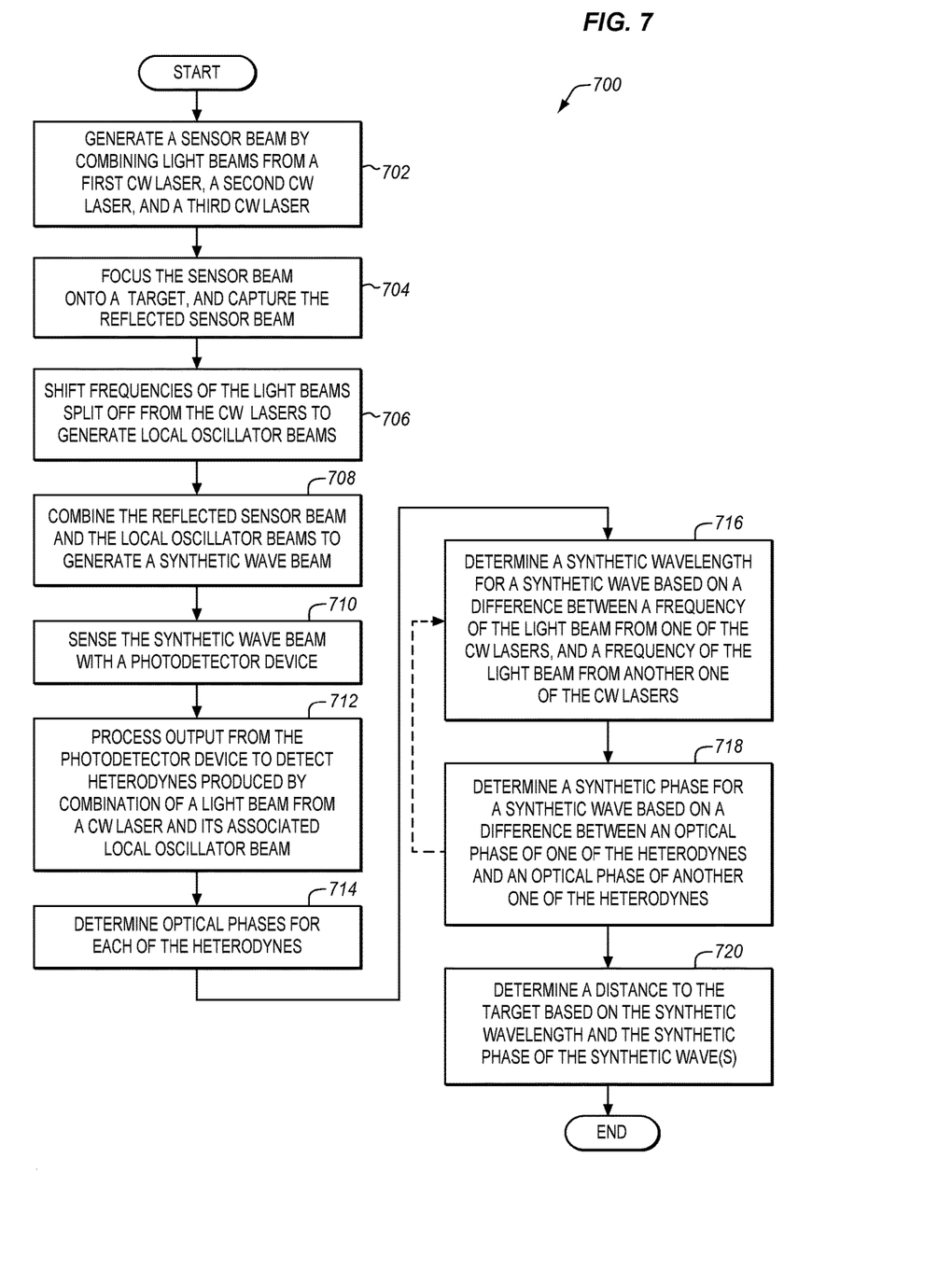
FIG. 7 is a flow chart illustrating a method for operating a laser ranging sensor in an exemplary embodiment.

Although a process for operating sensor 100 was described above, the following summarizes an exemplary method for measuring a distance to the target 204 using synthetic wave interferometry. FIG. 7 is a flow chart illustrating a method 700 for operating laser ranging sensor 100 in an exemplary embodiment. Method 700 will be described with respect to laser ranging sensor 100 of FIG. 1, although one skilled in the art will recognize that methods described herein may be performed by other devices or systems not shown. The steps of the methods described herein are not all inclusive and may include other steps not shown. The steps may also be performed in an alternate order.

As described above, method 700 uses synthetic wave interferometry to determine a distance to the target 204. Step 702 comprises generating a sensor beam by combining light beams from a first continuous-wave (CW) laser, a second CW laser, and a third CW laser. Step 704 comprises focusing the sensor beam onto the target 204, and capturing light reflected from the target 204, which is referred to as a reflected sensor beam. Step 706 comprises shifting frequencies of the light beams split off from the CW lasers to generate local oscillator beams. Step 708 comprises combining the reflected sensor beam and the local oscillator beams to generate a synthetic wave beam, and step 710 comprises sensing the synthetic wave beam with a photodetector device. Step 712 comprises processing output from the photodetector device to detect heterodynes produced by combination of a light beam from a CW laser and its associated local oscillator beam, and step 714 comprises determining optical phases for each of the heterodynes.

The method of FIG. 7 determines the distance to the target 204 by processing data from synthetic waves present in the synthetic wave beam. For a first synthetic wave, method 700 includes the step 716 of determining a synthetic wavelength for the first synthetic wave based on a difference between a frequency of the light beam from a first one of the CW lasers in the reflected sensor beam, and a frequency of the light beam from a second one of the CW lasers in the reflected sensor beam. Method 700 further includes the step 718 of determining a synthetic phase for the first synthetic wave based on a difference between an optical phase of the first one of the heterodynes and an optical phase of a second one of the heterodynes.

Steps 716-718 then repeat for additional synthetic waves. For example, for a second synthetic wave, step 716 comprises determining a synthetic wavelength for the second synthetic wave based on a difference between a frequency of the light beam from a first one of the CW lasers in the reflected sensor beam, and a frequency of the light beam from a third one of the CW lasers in the reflected sensor beam. Step 718 comprises determining a synthetic phase for the second synthetic wave based on a difference between an optical phase of the first one of the heterodynes and an optical phase of a third one of the heterodynes. If additional synthetic waves are present in the synthetic wave beam, then steps 716-718 may repeat for n synthetic waves.

After the data for the synthetic waves is determined, method 700 further includes the step 720 of determining the distance to the target based on the synthetic wavelength and the synthetic phase of the synthetic wave(s).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a first continuous-wave laser configured to generate a first light beam;
a second continuous-wave laser configured to generate a second light beam;
a third continuous-wave laser configured to generate a third light beam;
a first optical combiner configured to combine the first, second, and third light beams to generate a sensor beam;
a circulator device configured to direct the sensor beam from the first optical combiner to a telescope;
the telescope is configured to focus the sensor beam onto a target resulting in a reflected sensor beam;
the circulator device is configured to direct the reflected sensor beam from the telescope to a second optical combiner;
a first frequency shifter configured to receive a portion of the first light beam, and to frequency shift the first light beam by a first fixed amount to generate a first local oscillator beam;
a second frequency shifter configured to receive a portion of the second light beam, and to frequency shift the second light beam by a second fixed amount to generate a second local oscillator beam, wherein the second fixed amount is different than the first fixed amount;
a third frequency shifter configured to receive a portion of the third light beam, and to frequency shift the third light beam by a third fixed amount to generate a third local oscillator beam, wherein the third fixed amount is different than the first fixed amount and the second fixed amount;
the second optical combiner is configured to combine the reflected sensor beam and the first, second, and third local oscillator beams to generate a synthetic wave beam;
a first photodetector device configured to sense the synthetic wave beam to generate first output signals; and
a signal processor configured to process the first output signals from the first photodetector device to detect a first heterodyne produced by combination of the first local oscillator beam and the first light beam within the reflected sensor beam, to detect a second heterodyne produced by combination of the second local oscillator beam and the second light beam within the reflected sensor beam, to detect a third heterodyne produced by combination of the third local oscillator beam and the third light beam within the reflected sensor beam, and to determine optical phases for each of the first, second, and third heterodynes;
the signal processor is configured to determine a first synthetic wavelength for a first synthetic wave based on a difference between a first frequency of the first light beam within the reflected sensor beam and a second frequency of the second light beam within the reflected sensor beam, to determine a first synthetic phase for the first synthetic wave based on a difference between a first optical phase of the first heterodyne and a second optical phase of the second heterodyne, and to determine a distance to the target based on the first synthetic wavelength and the first synthetic phase.

2. The apparatus of claim 1 wherein:
the signal processor is configured to determine a second synthetic wavelength for a second synthetic wave based on a difference between the first frequency of the first light beam within the reflected sensor beam and a third frequency of the third light beam within the reflected sensor beam, to determine a second synthetic phase for the second synthetic wave based on a difference between the first optical phase of the first heterodyne and a third optical phase of the third heterodyne, and to determine the distance to the target based further on the second synthetic wavelength and the second synthetic phase.

3. The apparatus of claim 2 wherein:
the signal processor is configured to multiply the first synthetic wavelength and the first synthetic phase to calculate a first distance measurement to the target for the first synthetic wave.

4. The apparatus of claim 3 wherein:
the signal processor is configured to calculate an estimated phase of the second synthetic wave by dividing the first distance measurement calculated for the first synthetic wave by the second synthetic wavelength of the second synthetic wave, to add an integer portion of the estimated phase to the second synthetic phase to get a total phase for the second synthetic wave, and to multiply the total phase for the second synthetic wave and the second synthetic wavelength to calculate a second distance measurement for the second synthetic wave.

5. The apparatus of claim 1 further comprising:
a frequency comb laser configured to generate a set of light beams comprising a frequency comb;
a third optical combiner configured to combine the set of light beams from the frequency comb laser with the first, second, and third light beams from the first, second, and third continuous-wave lasers; and
a phase-lock controller configured to compare the frequencies of the first, second, and third light beams with the frequency comb generated by the frequency comb laser, and to tune the frequencies of the first, second, and third light beams from the first, second, and third continuous-wave lasers to different teeth of the frequency comb.

6. The apparatus of claim 5 wherein:
the teeth of the frequency comb are separated by a pulse repetition frequency of the frequency comb laser; and
the pulse repetition frequency of the frequency comb laser is tied to a frequency standard.

7. The apparatus of claim 6 wherein:
the frequency standard is defined by the National Institute of Standards and Technology (NIST).

8. The apparatus of claim 1 further comprising:
a reference channel comprising:
a third optical combiner configured to receive the sensor beam from the first optical combiner, and to combine the sensor beam and the first, second, and third local oscillator beams to generate a reference synthetic wave beam; and a second photodetector device configured to sense the reference synthetic wave beam to generate second output signals.

9. The apparatus of claim 8 wherein:
the signal processor is configured to process the second output signals from the second photodetector device to detect a fourth heterodyne produced by combination of the first local oscillator beam and the first light beam within the sensor beam, to detect a fifth heterodyne produced by combination of the second local oscillator beam and the second light beam within the sensor beam, to detect a sixth heterodyne produced by combination of the third local oscillator beam and the third light beam within the sensor beam, and to determine optical phases for the fourth, fifth, and sixth heterodynes;
the signal processor is configured to compare the first optical phase for the first heterodyne to a fourth optical phase of the fourth heterodyne, the second optical phase for the second heterodyne to a fifth optical phase of the fifth heterodyne, and the third optical phase for the third heterodyne to a sixth optical phase for the sixth heterodyne to determine if a phase shift was introduced by at least one of the first frequency shifter, the second frequency shifter, and the third frequency shifter.

10. The apparatus of claim 1 wherein:
the first photodetector device comprises an array of photodetectors in a digital camera.

11. A method of measuring a distance to a target, the method comprising:
generating a sensor beam by combining a first light beam, a second light beam, and a third light beam from a first continuous-wave laser, a second continuous-wave laser, and a third continuous-wave laser, respectively;
focusing the sensor beam onto the target resulting in a reflected sensor beam;
frequency shifting the first light beam by a first fixed amount to generate a first local oscillator beam;
frequency shifting the second light beam by a second fixed amount to generate a second local oscillator beam, wherein the second fixed amount is different than the first fixed amount;
frequency shifting the third light beam by a third fixed amount to generate a third local oscillator beam, wherein the third fixed amount is different than the first fixed amount and the second fixed amount;
combining the reflected sensor beam and the local oscillator beams to generate a synthetic wave beam;
sensing the synthetic wave beam with a first photodetector device;
processing output from the first photodetector device to detect a first heterodyne produced by combination of the first local oscillator beam and the first light beam within the reflected sensor beam, to detect a second heterodyne produced by combination of the second local oscillator beam and the second light beam within the reflected sensor beam, and to detect a third heterodyne produced by combination of the third local oscillator beam and the third light beam within the reflected sensor beam;
determining optical phases for each of the first, second, and third heterodynes;
determining a first synthetic wavelength for a first synthetic wave based on a difference between a first frequency of the first light beam and a second frequency of the second light beam;
determining a first synthetic phase for the first synthetic wave based on a difference between a first optical phase of the first heterodyne and a second optical phase of the second heterodyne; and
determining the distance to the target based on the first synthetic wavelength and the first synthetic phase.

12. The method of claim 11 further comprising:
determining a second synthetic wavelength for a second synthetic wave based on a difference between the first frequency of the first light beam within the reflected sensor beam and a third frequency of the third light beam within the reflected sensor beam;
determining a second synthetic phase for the second synthetic wave based on a difference between the first optical phase of the first heterodyne and a third optical phase of the third heterodyne; and
determining the distance to the target based further on the second synthetic wavelength and the second synthetic phase.

13. The method of claim 12 wherein determining the distance to the target comprises:
multiplying the first synthetic wavelength and the first synthetic phase to calculate a first distance measurement to the target for the first synthetic wave.

14. The method of claim 13 wherein determining the distance to the target comprises:
calculating an estimated phase of the second synthetic wave by dividing the first distance measurement calculated for the first synthetic wave by the second synthetic wavelength of the second synthetic wave;
adding an integer portion of the estimated phase to the second synthetic phase to get a total phase for the second synthetic wave; and
multiplying the total phase for the second synthetic wave and the second synthetic wavelength to calculate a second distance measurement for the second synthetic wave.

15. The method of claim 11 further comprising:
generating a set of light beams comprising a frequency comb with a frequency comb laser;
combining the set of light beams from the frequency comb laser with the first, second, and third light beams from the first, second, and third continuous-wave lasers;
comparing frequencies of the first, second, and third light beams with the frequency comb generated by the frequency comb laser; and
tuning the frequencies of the first, second, and third light beams from the first, second, and third continuous-wave lasers to different teeth of the frequency comb.

16. The method of claim 15 wherein:
the teeth of the frequency comb are separated by a pulse repetition frequency of the frequency comb laser; and
the pulse repetition frequency of the frequency comb laser is tied to a frequency standard.

17. The method of claim 16 wherein:
the frequency standard is defined by the National Institute of Standards and Technology (NIST).

18. The method of claim 11 further comprising:
combining the sensor beam and the local oscillator beams to generate a reference synthetic wave beam;
sensing the reference synthetic wave beam with a second photodetector device;
processing output from the second photodetector device to detect a fourth heterodyne produced by combination of the first local oscillator beam and the first light beam within the sensor beam, to detect a fifth heterodyne produced by combination of the second local oscillator beam and the second light beam within the sensor beam, and to detect a sixth heterodyne produced by combination of the third local oscillator beam and the third light beam within the sensor beam;

determining optical phases for the fourth, fifth, and sixth heterodynes; and comparing the first optical phase for the first heterodyne to a fourth optical phase of the fourth heterodyne, the second optical phase for the second heterodyne to a fifth optical phase of the fifth heterodyne, and the third optical phase for the third heterodyne to a sixth optical phase for the sixth heterodyne to determine if a phase shift was introduced during the frequency-shifting step.

19. An apparatus comprising:

a photodetector device; and a signal processor configured to process output signals from the photodetector device that senses a combined beam, wherein the combined beam comprises a combination of a reflected sensor beam resulting from directing light beams from at least three continuous-wave lasers at a target, and local oscillator beams resulting from frequency-shifting a portion of the light beams from each of the continuous-wave lasers by a different amount;

the signal processor is configured to detect heterodynes produced by combining the reflected sensor beam with the local oscillator beams, and to determine optical phases for the heterodynes;

the signal processor is configured to determine a synthetic wavelength based on a difference between a first frequency of a first light beam within the reflected sensor beam and a second frequency of a second light beam within the reflected sensor beam;

the signal processor is configured to determine a synthetic phase based on a difference between a first optical phase of a first one of the heterodynes and a second optical phase of a second one of the heterodynes;

the signal processor is configured to determine a distance to the target based on the synthetic wavelength and the synthetic phase.

20. The apparatus of claim 19 further comprising:

a calibration unit comprising:

a frequency comb laser configured to generate a set of light beams comprising a frequency comb; and a phase-lock controller configured to tune the frequencies of the light beams from the continuous-wave lasers to different teeth of the frequency comb.

* * * * *